United States Patent

Rynaski et al.

[11] Patent Number: 5,838,750
[45] Date of Patent: Nov. 17, 1998

[54] BINARY DATA ELECTRONIC COMMUNICATION SYSTEM

[75] Inventors: Richard F. Rynaski, Middlefield; Fred G. Williams, Kensington, both of Conn.

[73] Assignee: Otis Elevator Company, Farmington, Conn.

[21] Appl. No.: 550,973

[22] Filed: Oct. 31, 1995

[51] Int. Cl.⁶ .................................................. H04L 23/00
[52] U.S. Cl. ...................... 375/377; 375/316; 375/242; 364/715.03; 370/300; 371/2.1; 395/850; 395/200.66
[58] Field of Search .................................. 375/242, 377, 375/316, 295; 341/50; 370/300, 476; 371/2.1; 395/200.01, 200.03, 200.17, 850, 200.3, 200.31, 200.6, 200.66, 883, 884; 348/441, 467, 469; 364/715.03

[56] References Cited

U.S. PATENT DOCUMENTS

| | | | |
|---|---|---|---|
| 4,568,909 | 2/1986 | Whynacht | 340/21 |
| 4,662,538 | 5/1987 | Goudy, Jr. | 221/265 |
| 4,700,358 | 10/1987 | Duncanson et al. | 375/222 |
| 4,814,754 | 3/1989 | Kawasakin et al. | 345/156 |
| 5,398,782 | 3/1995 | Talbot | 187/393 |
| 5,416,917 | 5/1995 | Adair et al. | 395/500 |
| 5,444,491 | 8/1995 | Lim | 348/441 |
| 5,530,484 | 6/1996 | Bhatt et al. | 348/556 |

*Primary Examiner*—Stephen Chin
*Assistant Examiner*—Betsy L. Deppe

[57] ABSTRACT

A binary data communication system includes a transmitter unit coupled to a receiver unit via a communications link. The transmitter sends a message signal packet to the receiver. The packet includes data arranged according to mixed protocols. The receiver unit includes a program for detecting both protocols, and for converting data from one protocol (or format) into the other format.

1 Claim, 4 Drawing Sheets

| BINARY BYTE | NEXT BYTE | ASCII STRING |
|---|---|---|
| 0 | | THE MODEM IS DIALING |
| 1 | | THE STATE MACHINE IS IN CIS |
| 2 | 39 | 39 ALARMS ARE IN THE QUEUE |
| ETC. | ETC. | ETC. |

T

| TYPE 1 FORMAT | TYPE 2 FORMAT | TYPE 1 FORMAT |

THIS DIAGRAM REPRESENTS A PACKET WITH TYPE 2 FORMATED ASCII DATA EMBEDDED WITHIN THE ASCII DATA

NOW IS THE TIME [TYPE 2 DATA] FOR ALL GOOD MEN TO COME TO [TYPE 2 DATA]

1) ASCII MESSAGE: IN THIS CASE, THE ASCII MESSAGE IS

"NOW IS THE TIME FOR ALL GOOD MEN TO COME TO"

2) AND THE PREFERED TYPE 2 MESSAGE
   SYNC STREAM|<--8 BIT ENCRYPTION KEY-->|<--8 BIT REFERENCE TO THE ENCRYPTED BYTE
   IN THIS DATA THAT FOLLOWS|DATA,DATA,DATA| CRC-16

WHERE 1) SYNC STREAM IS PROTOCOL SYNCRONIZATION PATTERN,
         2) THE ENCRYPTION KEY IS A BYTE THAT IS USED TO ENCRYP ONE DATA BYTE (SEE BELOW)
         3) 8 BIT ENCRYPTION REFERENCE IS USED TO IDENTIFY THE ENCRYPTED DATA BYTE (SEE BELOW)
         4) DATA, DATA, DATA IS THE RAW (NON-ASCII) ELEVATOR DATA TO BE CONVERTED AND DISPLAYED
         5) CRC-16

| 16H | 16H | 0 | 1 | 02 | AA | 55 | CRC | CRC |

FIG.5

THE TYPE 2 PORTION OF THE INVENTION INCLUDES, EG,
THE 8 BIT ENCRYPTION KEY, TOGETHER WITH THE 8 BIT REFERENCE TO THE DATA FIELD. THE TRANSMITTER
PASSES TO THE TERMINAL EMULATOR, WITHIN THE MESSAGE PACKET A 8 BIT KEY THAT IS USED TO UNLOCK
THE 8 BIT REFERENCE TO THE ENCRYPTED BYTE. ONCE UNLOCKED, THIS 8 BIT REFERENCE POINTS TO JUST
ONE OF THE DATA BYTES IN THE DATA PORTION OF TYPE 2 PROTOCOL. ONCE THE TARGET BYTE IS IDENTIFIED,
THE ENCRYPTION KEY IS USED TO UNLOCK THE TARGET BYTE. THIS SAVES CPU COMPUTING TIME AND
MEMORY. BECAUSE ALL THE DATA, TOGETHER, IS REQUIRED TO USE THE PACKET, THE CORRUPTION OF 1
BYTE OFFERS SUFFICIENT PROTECTION FROM UNAUTHORIZED USE OF THE PACKET.

BINARY DATA ELECTRONIC COMMUNICATION SYSTEM

TECHNICAL FIELD

The present invention relates to electronic communication systems and, more particularly, to binary data electronic communication systems useful for monitoring and/or diagnosing elevator systems.

BACKGROUND

For safety, security and other reasons, it is often desirable to transmit elevator monitoring data in a form which is reasonably secure against unauthorized access.

Typically, such data is included within binary message signal packets transmitted in one format, such as the American Standard Code for Information Interchange (ASCII). The standard ASCII format consists of 96 displayed upper and lower case letters, plus 32 non-displayed control characters. An individual character code consists of seven bits plus one parity bit for error checking.

The present inventors have found that security of the data within a message signal packet is enhanced if the data within the packet has multiple formats. For example, in one preferred embodiment, some data has an ASCII format, while other data has a format according to another protocol such as PPP, SLIP, or MODBUS RTU, or even according to custom protocols as desired.

PPP is an acronym for point to point protocol, SLIP is an acronym for serial fink interface protocol , while MODBUS RTU is an acronym for MODBUS® remote terminal unit protocol, all being protocols for asynchronous transmission, and, all well understood in the electronic data communications art.

According to an essential feature of the present invention, data in a second format or protocol (hereinafter called, e.g., Type 2) is detected, and thereafter converted to another format (hereinafter called, e.g., Type 1) which is then written or transmitted to an output device such as a display screen. A binary data communication system according to the present invention includes a transmitter unit, a receiver unit, a communications link connected between said transmitter unit and said receiver unit, a binary communications packet including data having a Type 1 format and data having a Type 2 format, and a format detection and conversion routine stored within a, for example, a hard file or other direct access storage device (DASD) or other memory of the receiver unit. The transmitters and receiver are, e.g., personal computers which are connected to the link via suitable ports, interfaces and/or modems. The format detection conversion routine includes instructions for identifying the Type 2 data format and for converting the Type 2 format data into the Type 1 format data by means of, for example, a suitable look-up table which converts a Type 2 byte into a Type 1 format data string. The Type 1 (for example, ASCII) string is thereafter written or displayed to the output device such as the display screen or a printer. Of course, in place of a look-up table, conversion can be effected via suitable algorithms which are appropriately coded and stored within the DASD.

It is a principal object of the present invention to increase the reliability and security of binary data communications systems.

It is an additional object of the present invention to reduce the amount of data necessary to transmit useful information within an elevator monitoring system.

Further and still other objects of the present invention will become more readily apparent in light of the detailed description when taken in conjunction with the accompanying drawing, in which:

BRIEF DESCRIPTION OF THE DRAWINGS

FIG. 5 is a schematic diagram of additional fields to augment Type 2 data formats according to a further preferred embodiment of the invention.

BEST MODE FOR CARRYING OUT THE INVENTION

Figures 1, 3, 4:
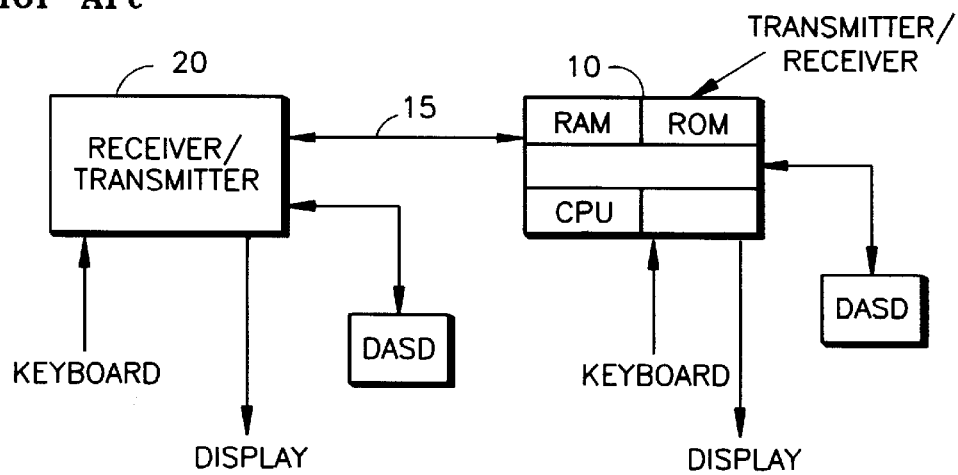
FIG. 1 is a block schematic diagram of a prior art binary data communication system in which the present invention may be implemented.
FIG. 3 is a look-up table stored within the DASD memory of the receiver unit for facilitating conversion of Type 2 format data into Type 1 format data.
FIG. 4 is a schematic diagram of a message signal packet according to the instant invention including data having multiple (e.g., two) formats.

FIG. 1 shows a prior art binary data communication system in which the present invention is implemented in software. A transmitter/receiver unit 10 (e.g., including an electronic computer) is electronically connected to a second electronic computer unit 20 via a data communications link 15, all as is well known. The unit 10 is suitably configured in known fashion to transmit message signal packets (e.g., ASCII format) while the unit 20 receives and processes the message signal packets. Each computer unit 10,20 includes an electronic processor (e.g., microprocessor) coupled, via suitable buses, etc., to a non-volatile memory (e.g., ROM, EE-Prom or FLASH EEProm), a volatile memory (e.g., RAM), and various controllers and Input/Output ports. The processor (CPU) is coupled, via the I/O ports, to a mass storage device (e.g., DASD or hard disk), an input device (e.g., keyboard) and to output device(s) such as a CRT or printer. The DASD memory includes instructions for processing and receiving data (e.g., alarm, alert, performance), and also includes data (e.g., a look-up table) and instructions useful for determining, for example, causes of an alarm and for causing notification of an alert or an alarm via the output devices, all as is well known. further explanation, see, for example, U.S. Pat. Nos. 4,568,909, 4,662,538, and 5,398,782, which are all hereby incorporated in their entireties by reference.

According to the present invention, the unit 10 is configured (e.g., by suitable software which would be well understood by those skilled in the art in view of the instant specification, to transmit a message signal packet (FIG. 4) to receiver 20 via link 15 (and, of course, suitable ports, modems, etc.). After reception by the receiver unit 20, the packet (FIG. 4) is analyzed and certain data is converted via a routine according to FIG. 2A. FIG. 2B is an improvement including steps 210 and 220. A number representing the number of Type 2 BYTES can be suitably included as part of the message signal packet of FIG. 4.

Figure 2A:
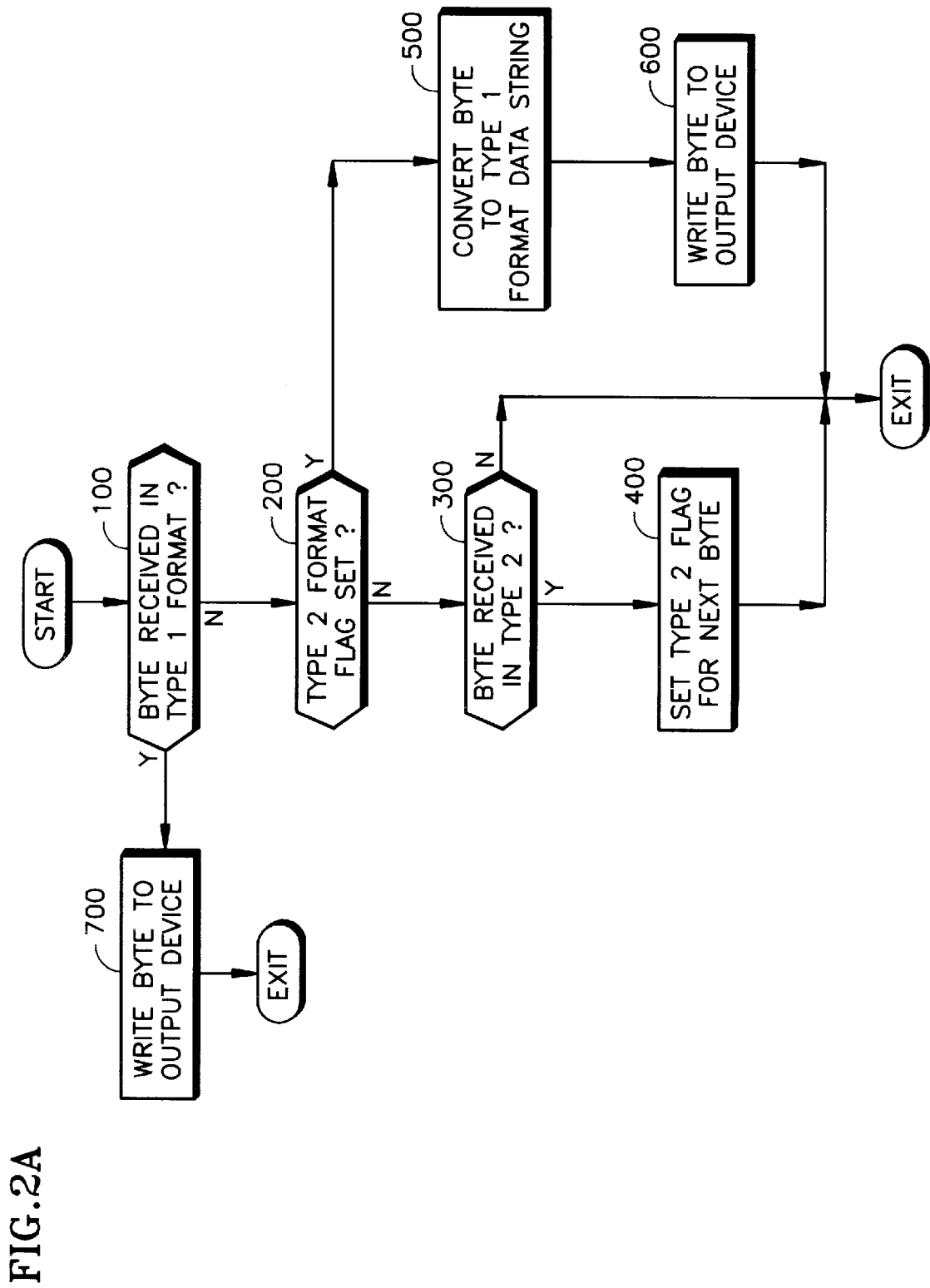
FIG. 2A is a high level logic flow diagram of a format detection and conversion routine according to the present invention.
Figure 2B:
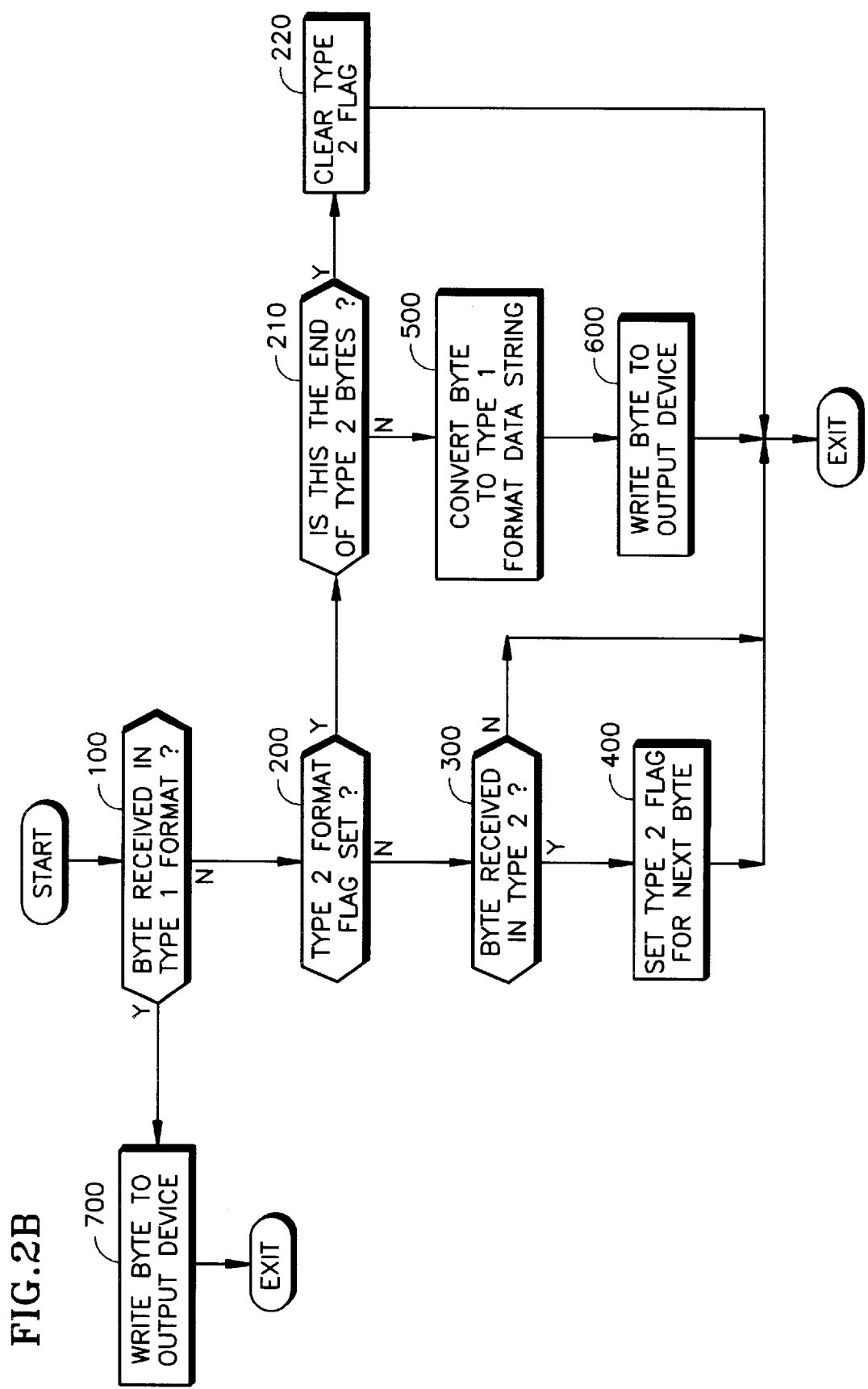
FIG. 2B is an inventive modification to the routine of FIG. 2A.

The routine of FIG. 2A can be executed periodically or executed after detection of any suitable identification information (ID bits, not shown) contained within the packet of FIG. 4.

In a step 100, a byte of the message signal packet is examined (step 100). If a Type 1 format (e.g., ASCII) is detected, transmit that byte directly to output device (e.g., display), step 700. If no in the step 100, is Type 2 format flag set, step 200? If yes in the step 200, convert byte to a Type 1 format data string by means of, for example, the look-up table (FIG. 3) which contains ASCII string data (or messages) corresponding to the binary byte, step 500. Write the ASCII string to the output device (step 600) and exit. If no in the step 200, is the received byte in a Type 2 format (step 300)? If no in the step 300, exit. If yes in the step 300, set the Type 2 flag (step 400) and exit.

In summary, the computer program for the instant invention (FIG. 2A) runs on, for example, an IBM compatible personal computer. Terminal emulators (according to the prior art) typically read one specific type of data (e.g., ASCII data) from a communication port, and display the data on the display screen or other output device soon after it is received. The present invention permits the data communication system to display both ASCII data soon after it is received, and a message originally formatted in a protocol different from the ASCII protocol. The present invention detects the different protocol anywhere within the ASCII data string. Upon detection of the different protocol, the data communication system of the instant invention converts the non-ASCII to ASCII data. The invention outputs all data in an ASCII format for display to the display screen.

While it has been shown and described what is presently considered preferred embodiments of the present invention, it will be readily understood to those skilled in the art that various changes and modifications may be made therein without departing from the spirit and scope of the present invention which shall be defined only by claims. For example, the Type 2 formatted data can be augmented as shown in FIG. 5 with an 8 bit encryption key, and an 8 bit reference to an encrypted byte in the data that follows in the message signal packet. The Type 2 portion of the invention can then be understood to include the 8 bit encryption key together with the 8 bit reference to the encrypted byte in the data field. The transmitter passes, to the terminal emulator (e.g., known software program), the 8 bit key used to unlock the 8 bit reference of the encrypted byte. Once unlocked, the 8 bit reference points to one of the data bytes in the data portion of the Type 2 protocol. Once the target byte is identified, the encryption key is used to unlock the target byte. This saves CPU computing time and memory. Because all of the data together (both Type 1 and Type 2 formats) is required to use the message signal packet, corruption of one byte offers sufficient protection from an unauthorized access to the message signal packet. See, for example, FIG. 5.

What is claimed is:

1. A method of transmitting alphanumeric binary data with enhanced security, comprising:

providing a message signal packet having a portion in a first standard data transmission format selected from the group consisting of ASCII, PPP, SLP and MODBUS, and having a second portion of said message signal packet in a second standard data transmission format selected from said group;

transmitting said message signal packet including data in both of said first and second standard data transmission formats;

receiving said message signal packet including data in both of said first and second standard data transmission formats;

detecting the portion of said message signal packet that is in said second standard data transmission format and converting said portion into said first standard data transmission format; and outputting said message signal packet in said first standard data transmission format to an output device.

* * * * *